US012327322B2

United States Patent
Chen et al.

(10) Patent No.: US 12,327,322 B2
(45) Date of Patent: Jun. 10, 2025

(54) SYSTEM AND METHOD FOR WORKPLACE SAFETY MANAGEMENT

(71) Applicant: METAL INDUSTRIES RESEARCH & DEVELOPMENT CENTRE, Kaohsiung (TW)

(72) Inventors: Shuo-Yen Chen, Kaohsiung (TW); Wei-Ching Wang, Kaohsiung (TW); Wei-Te Chen, Changhua County (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 269 days.

(21) Appl. No.: 18/190,146

(22) Filed: Mar. 27, 2023

(65) Prior Publication Data
US 2024/0169678 A1    May 23, 2024

(30) Foreign Application Priority Data

Nov. 21, 2022    (TW) .................................. 111144327

(51) Int. Cl.
G06T 19/00    (2011.01)
G08B 21/02    (2006.01)
H04W 64/00    (2009.01)

(52) U.S. Cl.
CPC ............ G06T 19/006 (2013.01); G08B 21/02 (2013.01); H04W 64/003 (2013.01)

(58) Field of Classification Search
None
See application file for complete search history.

(56) References Cited

U.S. PATENT DOCUMENTS

| 10,304,123 | B2* | 5/2019 | Joshi ..................... H04L 67/51 |
| 11,029,671 | B1 | 6/2021 | Guglielmo et al. |
| 11,803,955 | B1* | 10/2023 | Pandya ................ G08B 29/186 |
| 2008/0262666 | A1* | 10/2008 | Manning ................ A63C 17/12 701/1 |
| 2010/0183440 | A1* | 7/2010 | Von Mutius ............ F03D 17/00 416/37 |

(Continued)

FOREIGN PATENT DOCUMENTS

| CN | 109600400 A | 4/2019 |
| CN | 113923439 A | 1/2022 |

(Continued)

OTHER PUBLICATIONS

Kou et al.; "Review on Monitoring, Operation and Maintenance of Smart Offshore Wind Farms;" MPDI; Sensors 2022, 22, 2822; Basel, Switzerland; Published: Apr. 7, 2022 (Year: 2022).*

*Primary Examiner* — Edward Martello
(74) *Attorney, Agent, or Firm* — CKC & Partners Co., LLC

(57) ABSTRACT

A system and a method for workplace safety management are provided. The method includes: dividing a work field corresponding to the workplace into work zones; assigning an environmental indicator to each of the work zones according to environmental data of the workplace; generating AR warning image signals according to the work zones and the environmental indicator; transmitting the AR warning image signals respectively to wearable electronic devices located in the workplace; and each of the wearable electronic devices displaying an AR warning image according to the received AR warning image signal.

16 Claims, 9 Drawing Sheets

(56) References Cited

U.S. PATENT DOCUMENTS

2016/0291204 A1* 10/2016 Groenhagen ...... G01R 29/0842
2019/0384284 A1   12/2019 Harnett et al.
2022/0172594 A1*  6/2022 Cho ........................ G08B 7/06

FOREIGN PATENT DOCUMENTS

| CN | 113985913 A | 1/2022 |
| CN | 114530031 A | 5/2022 |
| CN | 114825616 A | 7/2022 |
| TW | 201823898 A | 7/2018 |
| TW | 202016507 A | 5/2020 |
| TW | M627284     | 5/2022 |

* cited by examiner

SYSTEM AND METHOD FOR WORKPLACE SAFETY MANAGEMENT

RELATED APPLICATIONS

This application claims priority to Taiwan Application No. 111144327 filed on Nov. 21, 2022, which is herein incorporated by reference in its entirety.

BACKGROUND

Technical Field

The present disclosure relates to a system and a method for workplace safety management, and more particularly to a system and a method for workplace safety management which are applicable to an offshore facility.

Description of Related Art

Because the wind direction on the sea is relatively stable and on the sea has no effect on living of nearby residents and generating of ecology, establishing a wind turbine on the sea (an offshore wind turbine) has become a future development trend. It has a security risk when operators perform to overhaul and maintain the offshore wind turbine. The operators need to overcome a risk for working at height and, moreover, to focus on whether a gale, a billow or a fire is occurring on the environment. Therefore, the safety management for the operators is very important to the development of offshore wind turbine.

SUMMARY

The purpose of the present disclosure provides a system and a method for safety management in a workplace, in which when wearable electronic devices worn by operators in a workplace display augmented reality (AR) images about environmental information, the operators are able to find out the environmental information on site immediately to pay more attention to the environment or to prevent from danger in advance under a condition without affecting operations, thereby ensuring the operators' safety at work.

An aspect of the present disclosure is to provide the system for workplace safety management, in which the system includes a plurality of wearable electronic devices and a central control host. Each wearable electronic device includes a communication module, a display and a processor. The processor is electrically connected to the communication module and the display. The central control host includes a communication module and a processor. The communication module is configured to perform wireless communications with the communication modules of the wearable electronic devices. The processor electrically connected to the communication module of the central control host and configured to: divide a work field corresponding to a workplace into a plurality of work zones; assign environmental indicators respectively to the work zones according to environmental data of the workplace; generate a plurality of AR warning image signals according to the work zones and the environmental indicators; transmit the AR warning image signals to the communication modules of the wearable electronic devices via the communication module of the central control host. The processors of the wearable electronic devices receive the AR warning image signals respectively from the communication modules of the wearable electronic devices, in which each of the processors of the wearable electronic devices controls the display to display an AR warning image according to the received AR warning image signal.

According to an embodiment of the present disclosure, the system further includes a first unmanned device. The first unmanned device includes a communication module, in which the communication module is configured to perform wireless communications with the communication modules of the wearable electronic devices and the communication module of the central control host. When the processor of the central control host generates and transmits the AR warning image signals to the communication module of the central control host, the communication module of the central control host transmits the AR warning image signals to the communication module of the first unmanned device, and the communication module of the first unmanned device transmits the AR warning image signals respectively to the communication modules of the wearable electronic devices.

According to an embodiment of the present disclosure, the system further includes a plurality of second unmanned devices. Each second unmanned device includes a communication module that is configured to perform wireless communications with one of the communication modules of the wearable electronic devices and the communication module of the first unmanned device When the processor of the central control host generates and transmits the AR warning image signals to the communication module of the central control host, the communication module of the central control host transmits the AR warning image signals to the communication module of the first unmanned device, and the communication module of the first unmanned device transmits the AR warning image signals respectively to the communication modules of the second unmanned devices, and the communication modules of the second unmanned devices transmit the AR warning image signals respectively to the communication modules of the wearable electronic devices.

According to an embodiment of the present disclosure, the first unmanned device further includes a first camera that is configured to capture a first image within a first monitoring range, and the first image is transmitted to the central control host via the communication module of the first unmanned device. Each of the second unmanned devices further includes a second camera that is configured to capture a second image within a second monitoring range, and the second image is transmitted to the first unmanned device via the communication module of the second unmanned device and transmitted to the central control host via the first unmanned device.

According to an embodiment of the present disclosure, the environmental data of the workplace includes at least one of wind strength data, wave data and fire detection data in the workplace, in which the wind strength data include wind direction information and wind speed information, and the wave data include wave direction information and wave height information.

According to an embodiment of the present disclosure, the first unmanned device further includes a first wind strength detector and a first fire detector, in which the first wind strength detector is configured to detect a wind direction and a wind speed at a location of the first unmanned device, and the first fire detector is configured to detect whether a fire occurs at the location of the first unmanned device. Each of the second unmanned devices further includes a second wind strength detector and a second fire detector, in which the second wind strength detector is configured to detect a wind direction and a wind speed at a location of the second unmanned device, and the second fire detector is configured to detect whether a fire occurs at the location of the second unmanned device. The environmental data of the workplace is provided from at least one of a weather station, the first unmanned device and the second unmanned devices.

According to an embodiment of the present disclosure, the processor of the central control host assigning the environmental indicator of each work zone includes: determining whether a difference between work zone data in the environmental data of the workplace corresponding to each work zone and an environmental base value is in a dangerous range, in which the environmental base value is adjusted by the processor of the central control host according to at least one of a location of the workplace and a user status; assigning dangerous environmental information to one of the environmental indicators when the corresponding difference is in the dangerous range; and assigning safe environmental information to one of the environmental indicators when the corresponding difference is not in the dangerous range.

According to an embodiment of the present disclosure, the difference of each work zone includes a wind speed difference and a wave height difference, and the dangerous environmental information includes wind strength dangerous information, wave dangerous information and wind and wave dangerous information. When the processor of the central control host determines whether the difference of each work zone is in the dangerous range and the difference of each work zone is in the dangerous range, the processor of the central control host is configured to: determine a wind speed dangerous grade of each work zone according to a location of each work zone in the work field and the corresponding wind speed difference, in which the wind speed dangerous grade includes one of a first wind speed dangerous grade, a second wind speed dangerous grade and a third wind speed dangerous grade; determine a wave height dangerous grade of each work zone according to the location of each work zone in the work field and the corresponding wave height difference, in which the wave height dangerous grade includes one of a first wave height dangerous grade and a second wave height dangerous grade; determine the difference of one of the work zones in the dangerous range and assign the wind and wave dangerous information to the environmental indicator when the wind speed dangerous grade is one of the second wind speed dangerous grade and the third wind speed dangerous grade and the wave height dangerous grade is the second wave height dangerous grade in the work zone; determine the difference of one of the work zones in the dangerous range and assign the wind strength dangerous information to the environmental indicator when the wind speed dangerous grade is the third wind speed dangerous grade and the wave height dangerous grade is the first wave height dangerous grade in the work zone; and determine the difference of one of the work zones in the dangerous range and assign the wave dangerous information to the environmental indicator when the wind speed dangerous grade is the first wind speed dangerous grade and the wave height dangerous grade is the second wave height dangerous grade in the work zone.

According to an embodiment of the present disclosure, each wearable electronic device further includes a position locator that is configured to locate at least one of an absolute location of the wearable electronic device and a relative location of the wearable electronic device with respect to other wearable electronic device and to generate a location signal. Each of the location signals is transmitted to the processor of the central control host. The processor of the central control host determines whether each of the wearable electronic devices is in a dangerous condition according to the location signals of the wearable electronic devices. The processor of the central control host generates a warning signal when determining one of the wearable electronic devices is in the dangerous condition.

According to an embodiment of the present disclosure, a plurality of wireless communication connections are built among the wearable electronic devices, and a plurality of video and audio information are transmitted among the wearable electronic devices. The processor of the central control host transmits a remote control signal via the communication module of the central control host to each wearable electronic device to control the processor of each wearable electronic device.

According to an embodiment of the present disclosure, the processor of each of the wearable electronic devices controls the display to display an AR operation guide video according to an operation guide instruction. Each of the wearable electronic devices further includes a sensor that is configured to detect a user's gesture to generate a sensing signal, and the sensing signal is transmitted to the processor of the wearable electronic device, and the processor of the wearable electronic device determines a control instruction according to the sensing signal to perform an operation.

According to an embodiment of the present disclosure, the system further includes a plurality of safe warning devices that are separately disposed in a plurality of areas in the workplace corresponding to the work zones. The processor of the central control host generates a plurality of environmental warning signals according to the work zones and the environmental indicators, and the environmental warning signals are transmitted respectively to the safe warning devices via the communication module of the central control host. Each of the safe warning devices generates at least one of light and a voice according to the received environmental warning signal.

An aspect of the present disclosure is to provide the method for workplace safety management. The method includes: dividing a work field corresponding to a workplace into a plurality of work zones; assigning an environmental indicator to each of the work zones according to environmental data of the workplace individually; generating a plurality of AR warning image signals according to the work zones and the environmental indicators; transmitting the AR warning image signals respectively to a plurality of wearable electronic devices located in the workplace; and each of the wearable electronic devices displaying an AR warning image according to the received AR warning image signal.

According to an embodiment of the present disclosure, the environmental data of the workplace includes at least one of wind strength data, wave data and fire detection data in the workplace, in which the wind strength data includes wind direction information and wind speed information, and the wave data includes wave direction information and wave height information.

According to an embodiment of the present disclosure, the environmental data of the workplace is provided from at least one of a weather station and an unmanned device located in the workplace.

According to an embodiment of the present disclosure, assigning the environmental indicator to each work zone includes: determining whether a difference between work zone data in the environmental data of the workplace corresponding to each work zone and an environmental base value is in a dangerous range; assigning dangerous environmental information to one of the environmental indicators when the corresponding difference is in the dangerous range; and assigning safe environmental information to one of the environmental indicators when the corresponding difference is not in the dangerous range.

According to an embodiment of the present disclosure, the environmental base value is adjusted according to at least one of a location of the workplace and a user status.

According to an embodiment of the present disclosure, the difference of each work zone includes a wind speed difference and a wave height difference, and the dangerous environmental information includes wind strength dangerous information, wave dangerous information and wind and wave dangerous information. Determining whether the difference of each work zone is in the dangerous range and the difference of each work zone in the dangerous range includes: determining a wind speed dangerous grade of each work zone according to a location of each work zone in the work field and the corresponding wind speed difference, in which the wind speed dangerous grade includes one of a first wind speed dangerous grade, a second wind speed dangerous grade and a third wind speed dangerous grade; determining a wave height dangerous grade of each work zone according to the location of each work zone in the work field and the corresponding wave height difference, in which the wave height dangerous grade includes one of a first wave height dangerous grade and a second wave height dangerous grade; determining the difference of one of the work zones in the dangerous range and assigning the wind and wave dangerous information to the environmental indicator when the wind speed dangerous grade is one of the second wind speed dangerous grade and the third wind speed dangerous grade and the wave height dangerous grade is the first wave height dangerous grade in the work zone; determining the difference of one of the work zones in the dangerous range and assigning the wind strength dangerous information to the environmental indicator when the wind speed dangerous grade is the third wind speed dangerous grade and the wave height dangerous grade is the first wave height dangerous grade in the work zone; and determining the difference of one of the work zones in the dangerous range and assigning the wave dangerous information to the environmental indicator when the wind speed dangerous grade is the first wind speed dangerous grade and the wave height dangerous grade is the second wave height dangerous grade in the work zone.

According to an embodiment of the present disclosure, the method further includes: determining whether each wearable electronic device is in a dangerous condition according to a plurality of location signals generated respectively by the wearable electronic devices, in which each of the location signals is configured to indicate at least one of an absolute location of the wearable electronic device and a relative location of the wearable electronic device with respect to other wearable electronic device; and generating a warning signal when one of the wearable electronic devices is in the dangerous condition.

According to an embodiment of the present disclosure, the method further includes: generating a plurality of environmental warning signals according to the work zones and the environmental indicators; transmitting the environmental warning signals respectively to a plurality of safe warning devices located in the workplace; and each of the safe warning devices generating at least one of light and a voice according to the received environmental warning signal.

BRIEF DESCRIPTION OF THE DRAWINGS

In order to make the aforementioned features and advantages of the present disclosure been clear and more fully understood, the following specific examples are given and described in detail with the accompanying drawings as follows.

DETAILED DESCRIPTION

Embodiments of this disclosure are described in detail as follows. However, it can be understood that, the embodiments are provided many applicable concepts, which may implement in any kind of specific context. The embodiments which are described and disclosed in this context are merely provided for illustration and not intended to limit the scope of the present disclosure.

Terms used in this context are merely for distinguishing specific embodiments and not intended to limit the patent scope. Unless otherwise limited, the term "a" or "the" in a singular form may also be used to represent in a plural form.

Figure 1:
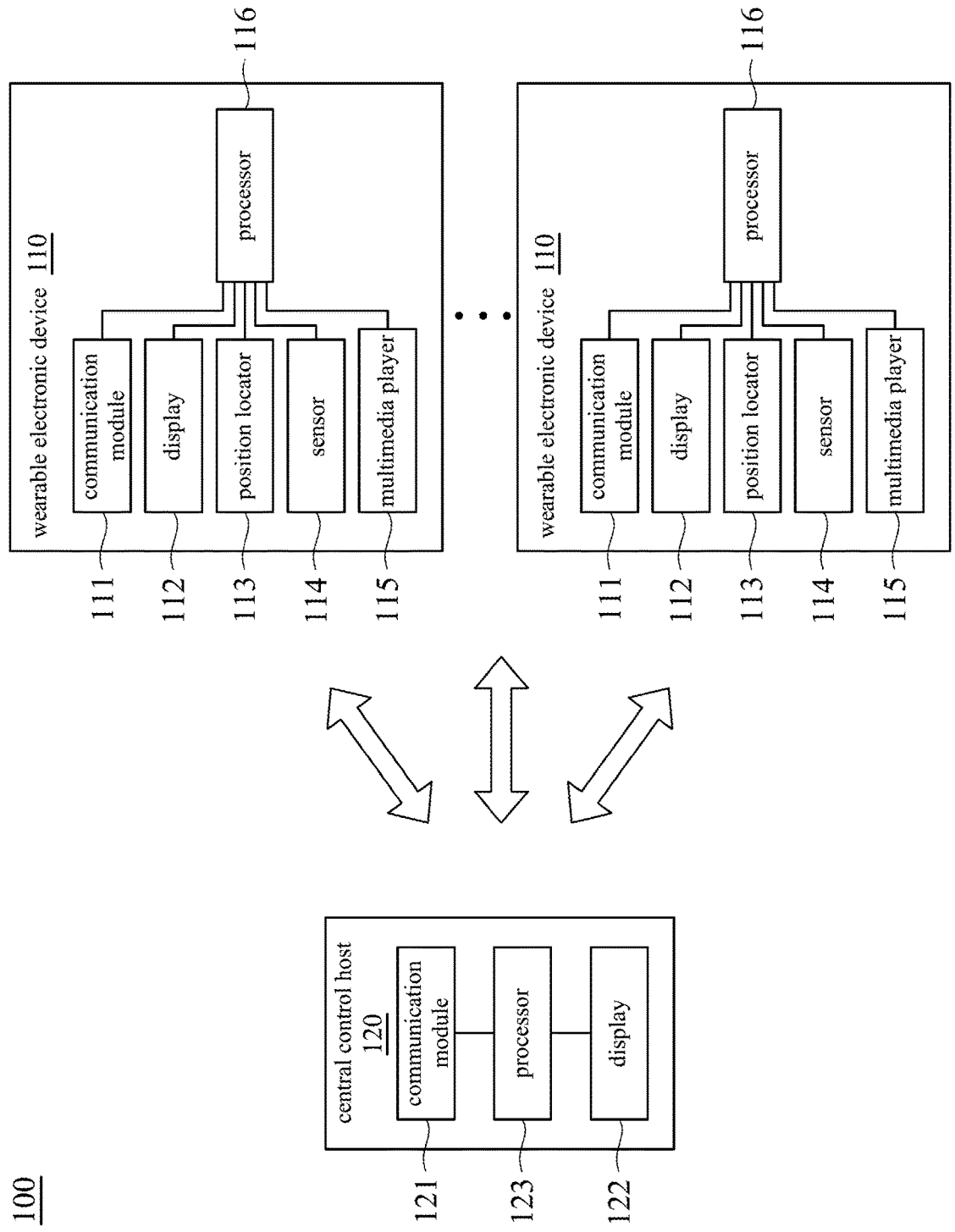
FIG. 1 illustrates a block diagram of a system for safety management in a workplace in accordance with a first embodiment of the present disclosure.

Referring to FIG. 1, FIG. 1 illustrates a block diagram of a system 100 for workplace safety management in accordance with a first embodiment of the present disclosure. The system 100 may be applied to a dangerous workplace, such as a wind turbine and an oil platform in an offshore facility, and a construction site. In this embodiment, the workplace is illustrated by an offshore wind turbine. The system 100 includes wearable electronic devices 110 and a central control host 120.

The wearable electronic devices 110, such as augmented reality (AR) headsets, are worn on operators in the workplace. Each wearable electronic device 110 includes a communication module 111, a display 112, a position locator 113, a sensor 114, a multimedia player 115 and a processor 116.

The communication module 111 is configured to receive and transmit wireless signals, and may be used to build a communicative connection between the wearable electronic device 110 and another electronic device. The display 112 is configured to display an AR image. The display 112 may display a front-view image of the operator wearing the wearable electronic devices 110 as well as a superimposed AR image. The position locator 113 is configured to locate the wearable electronic device 110 to obtain a location signal with an absolute location of the wearable electronic device 110 and/or relative locations of the wearable electronic device 110 with respect to other wearable electronic devices 110. In one example, the position locator 113 may be a Global Positioning System (GPS) module for obtaining the absolute location of the wearable electronic device 110. In another example, the position locator 113 may be an optical ranging element adopting a time of flight (ToF) technology and/or a structured light technology for obtaining the relative locations of the wearable electronic device 110 with respect to other wearable electronic devices 110.

The sensor 114 is configured to detect an action of the operator (e.g. a gesture of the operator) to generate a sensing signal. The sensor 114 may also be an optical ranging element which adopts a ToF technology and/or a structured light technology. In this example, the sensor 114 and the position locator 113 may share the same component.

The multimedia player 115 is configured to capture video and audio information on site and to play voice. The multimedia player 115 may include a camera, a microphone and an audio element. The processor 116 is electrically connected to the communication module 111, the display 112, the position locator 113, the sensor 114 and the multimedia player 115, and receives instructions to control the communication module 111, the display 112, the position locator 113, the sensor 114 and the multimedia player 115. In addition to receiving the instructions from the central control host 120 to control the display 112 to display an AR warning image related to workplace safety, the processor 116 also determines a control instruction according to the sensing signal generated by the sensor 114 to perform an operation accordingly. For example, when an operator works in a nacelle of the wind turbine, the operator needs to check an operation guide of operating procedures to shorten the operating time. The operator can make a gesture corresponding to an operation guide. When detecting the gesture the sensor 114 generates and transmits a sensing signal to the processor 116, and then the processor 116 determines the operation guide according to the sensing signal to control the display 112 to display an AR guide.

In addition, the operator may make a gesture corresponding to an application, such as a group video conference, a video stream, a voice call, and the processor 116 controls the communication module 111 to transmit video and audio information generated by the multimedia player 115 to the other wearable electronic devices 110 according to the gesture, so that the wearable electronic devices 110 receive the video and audio information and generate AR images or play voices accordingly. The wearable electronic device 110 may perform a group video conference, video streams and a voice call by transmitting video and audio information.

The central control host 120 is located in a safe place such as a boat on the sea and close to a land different from the workplace. An instructor may control and manage the operators in the workplace by operating the central control host 120 directly or using other electronic devices to connect the central control host 120. The central control host 120 includes a communication module 121, a display 122 and a processor 123. The communication module 121 is configured to receive and transmit wireless signals, and is configured to perform wireless communications with the communication modules 111 of the wearable electronic devices 110. The display 122 is configured for video display. The processor 123 is electrically connected to the communication module 121 and the display 122 and has a calculation function.

The central control host 120 may generate video and audio information by electrically connecting a multimedia device (not shown). The central control host 120 may receive/transmit video and audio information with the wearable electronic devices 110, and may receive/transmit video and audio information among the wearable electronic devices 110 and an electronic device used by an instructor, so that the instructor may monitor the video calls and the voice calls of the operators and perform video conferences and voice calls with the operators to ensure safety of the operators.

The central control host 120 may also perform functions of screen sharing and remote control. For example, the processor 123 transmits the information related to the display 122 displaying via the communication module 121 to any of the wearable electronic devices 110 to perform the function of screen sharing, or the processor 123 transmits a remote control signal via the communication module 121 to any of the wearable electronic devices 110 to control the processor 116 thereof to perform remote control. Therefore, when the operators encounter difficulties, the instructor may perform functions of screen sharing and remote control on the central control host 120 for support.

Figure 2:
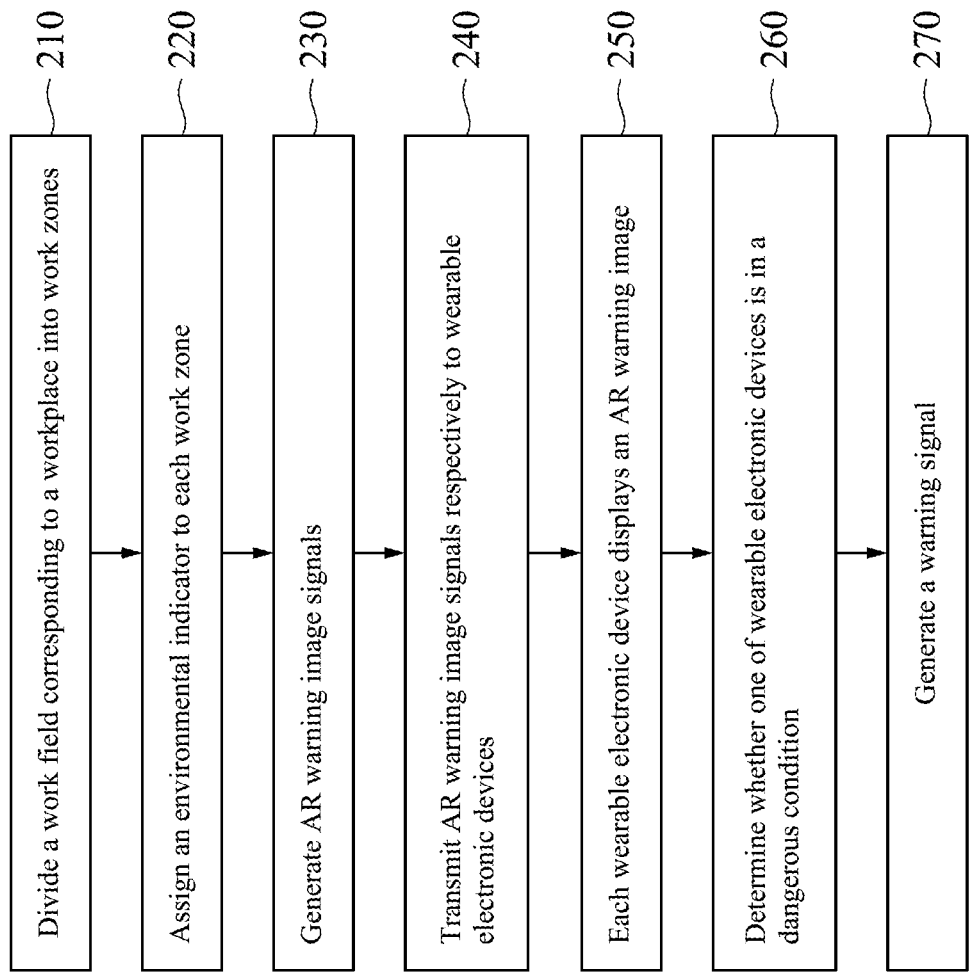
FIG. 2 illustrates a flow chart of a method for safety management in the workplace in accordance with some embodiments of the present disclosure.

Referring to FIG. 2, FIG. 2 illustrates a flow chart of a method 200 for workplace safety management in accordance with some embodiments of the present disclosure. In the following description, the method 200 applied to the system 100 is exemplified, but the method 200 may also be applied to other similar management system according to the following description by those skilled in the art. The method 200 includes steps 210, 220, 230, 240 and 250.

Figure 4B:
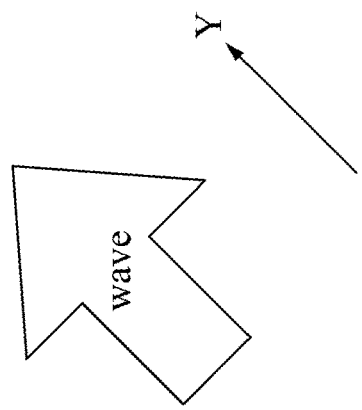
FIG. 4B illustrates a schematic diagram of a wave height dangerous grade of each work zone in the work field.
Figure 4A:
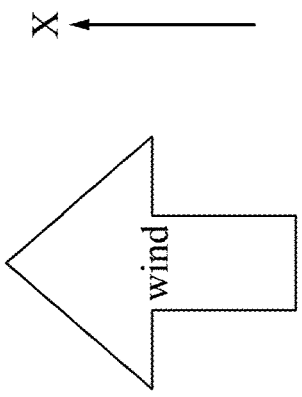
FIG. 4A illustrates a schematic diagram of a wind speed dangerous grade of each work zone in a work field.
Figure 4C:
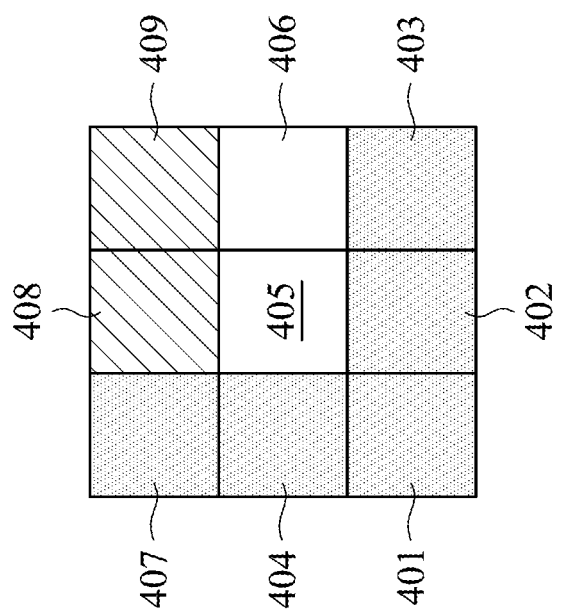
FIG. 4C illustrates a schematic diagram of an augmented reality (AR) warning image.

At first, in step 210, the processor 123 divides a work field corresponding to the workplace into work zones. The work field may be a layer of one plane (e.g., a working platform of the wind turbine) or many layers of plural planes (e.g., the working platform and the nacelle of the wind turbine), but embodiments of the present disclosure are not limited thereto. In addition, the work field corresponding to the wind turbine also expands to the boat on the sea and a place to climb the ladder to the working platform. The number of work zones is not limited, and in this example, one layer of one plane divided into nine work zones is illustrated for example (as shown in FIGS. 4A, 4B and 4C).

In step 220, the processor 123 assigns environmental indicator to each of the work zones according to environmental data of the workplace. The environmental data of the workplace include at least one of wind strength data, wave data and fire detection data in the workplace. The wind strength data include wind direction information and wind speed information. The wave data include wave direction information and wave height information. In this example, the environmental data of the workplace are illustrated by the wind strength data, the wave data and the fire detection data for example, in which the wind strength data and the wave data are provided by a weather station, and the fire detection data are provided by a fire alarm device located in the workplace. The fire alarm device may be a smoke detector or a fixed temperature heat detector.

Figure 3:
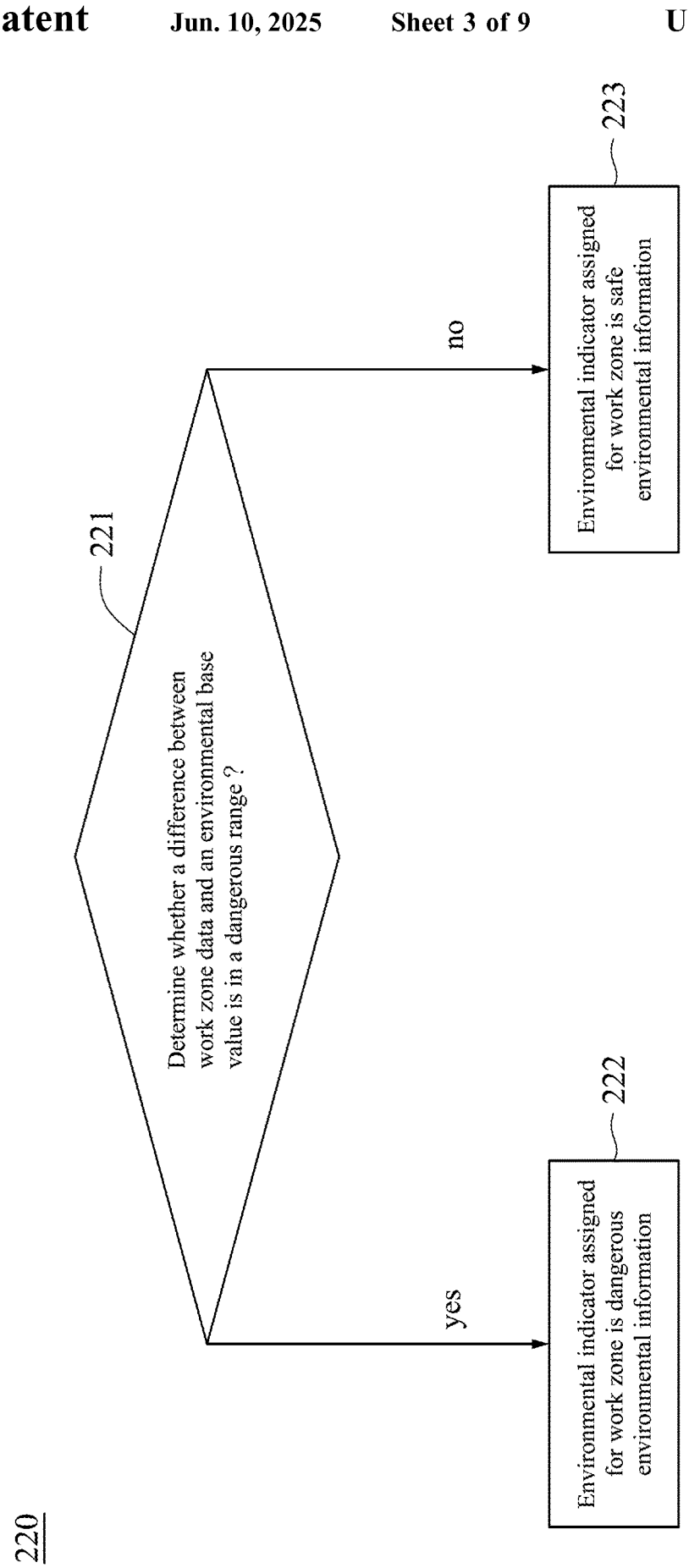
FIG. 3 illustrates a flow chart of sub-steps of step 220 in FIG. 2.

Referring to FIG. 3, FIG. 3 illustrates a flow chart of sub-steps of step 220 in FIG. 2. Step 220 further includes sub-steps 221 to 223. The environmental data of the workplace include work zone data. The work zone data correspond to the work zones, respectively.

In sub-step 221, the processor 123 determines whether a difference between work zone data in the environmental data of the workplace corresponding to each work zone and an environmental base value is in a dangerous range.

In sub-step 222, when determining the difference is in the dangerous range, the processor 123 assigns dangerous environmental information to the environmental indicator of the corresponding work zone.

In sub-step 223, when determining the difference is not in the dangerous range, the processor 123 assigns safe environmental information to the environmental indicator of the corresponding work zone.

Then, in step 230, the processor 123 generates AR warning image signals according to the work zones and the environmental indicators corresponding to the work zones. Each AR warning image signal indicates a video of the work zones and the environmental indicators corresponding to the work zones.

In step 240, the communication module 121 is controlled to transmit the AR warning image signals respectively to the communication modules 111 of the wearable electronic devices 110.

In step 250, the processors 116 of the wearable electronic devices 110 receives the AR warning image signals from the communication modules 111, in which the processor 116 of each wearable electronic device 110 controls the corresponding display 112 to display an AR warning image according to the received AR warning image signal. Therefore, based on the aforementioned steps, the operators worn the wearable electronic devices 110 in the workplace may find out areas corresponding to the work zones in the workplace are safe environments or dangerous environments by watching the AR warning images, thereby achieving the purpose of warning. The operators can avoid staying in a long period in dangerous environments, or find out how to go to safe environments from dangerous environments. For example, when a fire occurs, the operators can find out that the certain areas are safe environments without effecting by the fire and the certain areas are dangerous environments with effecting by the fire by watching the AR warning images, and the operators can look for escape routes according to the AR warning images.

It should be supplemented that the environmental base value is adjusted by the processor 123 according to at least one of the location of the workplace and a user status. The adjustment rules of the environmental base value are set in the processor 123 in advance or in real time by the instructor. For example, the larger the difference is, the easier the difference falls into the dangerous range. In one example, if the average of winds of the location in the workplace is much stronger and the average of waves of the location in the workplace is much greater, the environmental base value corresponding to a wind strength reference and a wave height reference is adjusted higher by the processor 123, and that are the wind strength and the wave height under a normal condition without taking into consideration. In another example, if the operators have continuously worked in the workplace for several days, the processor 123 adjusts the environmental base value lower according to the user status to consider the increment of dangerous because the operators are exhausted.

Referring to FIGS. 4A, 4B and 4C, FIG. 4A illustrates a schematic diagram of a wind speed dangerous grade of each work zone in the work field, and FIG. 4B illustrates a schematic diagram of a wave height dangerous grade of each work zone in the work field, and FIG. 4C illustrates a schematic diagram of the AR warning image. Further, in sub-steps 221 and 222, the following will be illustrated for determining whether the difference between the wind strength data in the environmental data and the environmental base value and between the wave data in the environmental data and the environmental base value is in the dangerous range.

The difference of each work zone includes a wind speed difference and a wave height difference. The dangerous environmental information includes wind strength dangerous information, wave dangerous information and wind and wave dangerous information. When the wind strength dangerous information is assigned to the work zone, it means that a wind strength level of the work zone is dangerous, and the display 112 displays the AR warning image corresponding to the work zone for such as yellow (shown in an oblique line image). When the wave dangerous information is assigned to the work zone, it means that a wave level of the work zone is dangerous, and the display 112 displays the AR warning image corresponding to the work zone for such as blue (shown in a dot image). When the wind and wave dangerous information is assigned to the work zone, it means that the wind strength level and the wave level of the work zone are dangerous, and the display 112 displays the AR warning image corresponding to the work zone for such as red (shown in a grayscale image).

At first, the processor 123 determines the wind speed dangerous grade of each work zone according to the location in the work field and the wind speed difference of each work zone. The wind speed dangerous grade includes one of a first wind speed dangerous grade, a second wind speed dangerous grade and a third wind speed dangerous grade, in which the third wind speed dangerous grade is much more dangerous to the operators, and the first wind speed dangerous grade does not affect the safety of the operators, and the second wind speed dangerous grade is at a level between the third wind speed dangerous grade and the first wind speed dangerous grade. As shown in FIG. 4A, in the nine work zones, because a wind direction is towards a direction X, there are buffers formed in the areas corresponding to the work zones 401 to 406 for the operators based on the areas corresponding to the work zones 407 to 409, and the operators in the areas corresponding to the work zones 401 to 406 may not fall into the sea. The work zones 401 to 406 are assigned for the second wind speed dangerous grade, the second wind speed dangerous grade, the second wind speed dangerous grade, the second wind speed dangerous grade, the first wind speed dangerous grade and the second wind speed dangerous grade respectively. There is a column in the area corresponding to the work zone 405 for the operators to hold, therefore, and the work zone 405 is assigned for the first wind speed dangerous grade. Because the operators in the areas corresponding to the work zones 407 to 409 may have danger to be blown by the wind to fall into the sea, the work zones 407 to 409 are all assigned for the third wind speed dangerous grades. In this example, the first wind speed dangerous grade, the second wind speed dangerous grade and the third wind speed dangerous grade represent the number zero, the number two and the number three respectively.

Then, the processor 123 determines the wave height dangerous grade of each work zone according to the location in the work field and the wave height difference of each work zone. The wave height dangerous grade includes one of a first wave height dangerous grade and a second wave height dangerous grade, in which the second wave height dangerous grade is much more dangerous to the operators, and the first wave height dangerous grade does not affect the safety of the operators. As shown in FIG. 4B, in the nine work zones, because a wave direction is towards a direction Y, the operators in the areas corresponding to the work zones

401, 402, 403, 404 and 407 may be hit by the wave, and the work zones 401, 402, 403, 404 and 407 are all assigned for the second wave height dangerous grades. The operators in the areas corresponding to the work zones 405, 406, 408 and 409 are neither affected by the wave, so the work zones 405,406,408 and 409 are all assigned for the first wave height dangerous grades. In this example, the first wave height dangerous grade and the second wave height dangerous grade represent the number zero and the number two respectively.

Then, the processor 123 performs the following determining.

When the wind speed dangerous grade is one of the second wind speed dangerous grade and the third wind speed dangerous grade and the wave height dangerous grade is the second wave height dangerous grade in any work zone, the difference of the corresponding work zone is in the dangerous range and the assigned environmental indicator of the corresponding work zone is the wind and wave dangerous information. As shown in FIG. 4C, the assigned environmental indicators of the work zones 401, 402, 403, 404 and 407 are the wind and wave dangerous information, and the AR warning images of the work zones 401, 402, 403, 404 and 407 are such as red (shown in grayscale images).

When the wind speed dangerous grade is the third wind speed dangerous grade and the wave height dangerous grade is the first wave height dangerous grade in any work zone, the difference of the corresponding work zone is in the dangerous range and the assigned environmental indicator of the corresponding work zone is the wind dangerous information. As shown in FIG. 4C, the assigned environmental indicators of the work zones 408 and 409 are the wind dangerous information, and the AR warning images of the work zones 408 and 409 are such as yellow (shown in oblique line images).

When the wind speed dangerous grade is the first wind speed dangerous grade and the wave height dangerous grade is the second wave height dangerous grade in any work zone, the difference of the corresponding work zone is in the dangerous range and the assigned environmental indicator of the corresponding work zone is the wave dangerous information. In FIG. 4C, there is no the assigned environmental indicator of the work zone assigning to the wave dangerous information. In FIG. 4C, the work zones 405 and 406 of the assigned safe environmental information display no color.

Therefore, the AR warning images of the work zones 401 to 409 are displayed by the display 112, the operators can easily find out whether the environment of the area corresponding to each work zone is dangerous or not and the sorts of dangers, thereby paying more attention or preventing from dangers in advance.

It should be supplemented that the processor 123 just determines the wind speed dangerous grade or the wave height dangerous grade of each work zone according to the instructions. When the processor 123 just determines the wind speed dangerous grades, the wave height dangerous grade of each work zone is set to the first wave height dangerous grade first. When the processor 123 just determines the wave height dangerous grades, the wind speed dangerous grade of each work zone is set to the first wind speed dangerous grade first. The instructor may adjust the method for determinations of the processor 123 according to a real use situation, so that it is convenient to use the wearable electronic devices 110 for the operators.

Referring to FIG. 1 and FIG. 2, the method 200 further includes steps 260 and 270.

In step 260, the processor 123 determines whether any wearable electronic device 110 is in a dangerous condition according to the location signals generated by the wearable electronic devices 110, in which each location signal is used to indicate at least one of an absolute location of the wearable electronic device 110 and a relative location of the wearable electronic device 110 with respect to other wearable electronic device 110. When determining whether any wearable electronic device 110 is in the dangerous condition, the processor 123 performs step 270. When determining no wearable electronic device 110 in the dangerous condition, the processor 123 returns to step 260. For example, the danger condition is a position variation of the wearable electronic device 110 for excess of a predetermined variation threshold; the dangerous condition is that the wearable electronic device 110 stays in the area corresponding to the work zone of the dangerous environmental information over a predetermined time; the dangerous condition is that the wearable electronic device 110 leaves a specified area over a predetermined time. In one example, the dangerous condition may be that the operator falls from the area corresponding to one of the work zones to the area corresponding to another work zone or the sea, such that the position variation of the wearable electronic device 110 is in excess of the predetermined variation threshold. In another example, the dangerous condition may be that the operator stays in the area corresponding to the work zone of the dangerous environmental information and dangerous accidents of hit by the wave, blown down by the wind and choked by smoke etc. happen to the operator, such that the wearable electronic device 110 stays in the area corresponding to the work zone of the dangerous environmental information over the predetermined time.

In step 270, when any wearable electronic device 110 is in the dangerous condition, the processor 123 generates a warning signal. For example, the processor 123 generates the warning signal to control the display 122 to display a warning picture, and the instructor looks at the warning picture to be able to immediately make sure a physical state of the operator wearing the wearable electronic device 110 to perform a follow-up action such as rescue.

Figure 5:
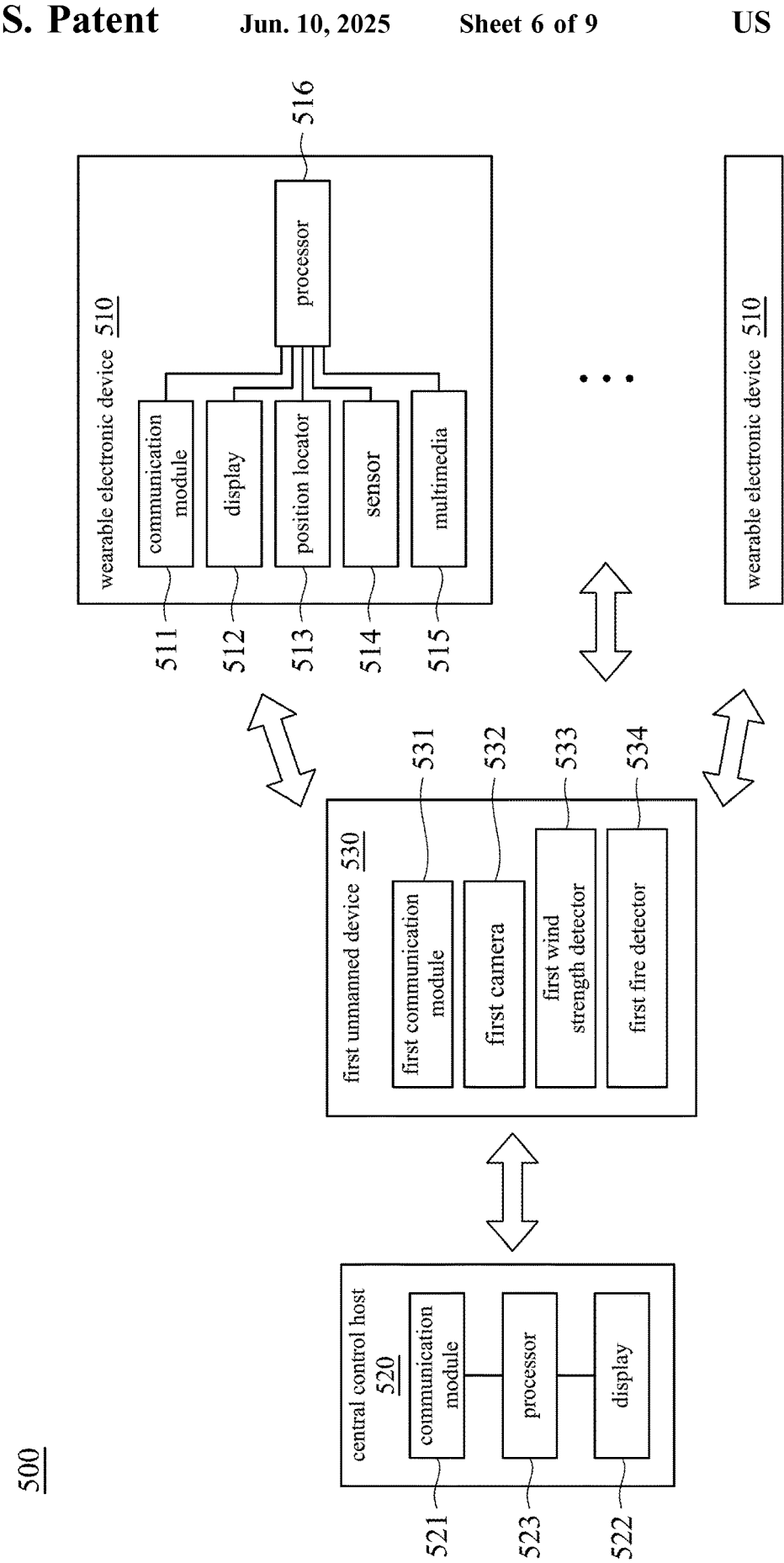
FIG. 5 illustrates a block diagram of the system for safety management in the workplace in accordance with a second embodiment of the present disclosure.

Referring to FIG. 5, FIG. 5 illustrates a block diagram of the system 500 for safety management in the workplace in accordance with a second embodiment of the present disclosure. The system 500 of the second embodiment is similar to the system 100 of the first embodiment, and in contrast with the system 100, the system 500 further includes a first unmanned device 530. The first unmanned device 530 is such as drone. The first unmanned device 530 includes a first communication module 531, a first camera 532, a first wind strength detector 533 and a first fire detector 534. In the second embodiment, the first unmanned device 530 is in a position between the central control host 520 and the wearable electronic devices 510, in which the first unmanned device 530 assists to transmit signals between the central control host 520 and the wearable electronic devices 510 through performing wireless communications by the first communication module 531 with the communication modules 511 of the wearable electronic devices 510 and the communication module 521 of the central control host 520, so that the signals between the central control host 520 and the wearable electronic devices 510 are transmitted much better. The first camera 532 is configured to capture a first image within a first monitoring range at regular time, and the first image is transmitted to the central control host 520 by the first communication module 531. The first monitoring range is, for example, a capturing image range at the location of the first unmanned device 530. The instructor may cooperate to determine the states of the operators in the first monitoring range by watching the first images of the first monitoring range. The first wind strength detector 533 is configured to detect the wind direction and the wind speed at its location. The first fire detector 534 is configured to detect whether a fire occurs at its location. The first fire detector 534 is similar to the fire alarm device performed by the smoke detector or the fixed temperature heat detector. The first unmanned device 530 is configured to use a point-to-point communication method to provide the first images and the detected wind strength data and the detected fire detection data thereof.

Referring to FIG. 2 and FIG. 5, the system 500 of the second embodiment may also perform the method 200.

The method 200 performed by the system 500 of the second embodiment is similar to the method 200 performed by the system 100 of the first embodiment, in which the differences are steps 220 and 240.

In step 220, the wind strength data and the fire detection data in the environmental data of the workplace may also be provided by the first wind strength detector 533 and the first fire detector 534 of the first unmanned device 530. For example, the processor 523 may set a new environmental data of the workplace according to the environmental data of the workplace provided by a weather station and the first unmanned device 530, so that the AR warning images conform more to the real environment in the workplace on site.

In step 240, the communication module 521 is controlled to transmit the AR warning image signals to the first communication module 531 of the first unmanned device 530 first, and the first communication module 531 then transmits the AR warning image signals to the communication modules 511 of the wearable electronic devices 510 respectively.

In addition, in FIG. 5, the features and the functions of the display 512, the position locator 513, the sensor 514, the multimedia player 515 and the processor 516 of each wearable electronic device 510 are similar to the features and the functions of the display 112, the position locator 113, the sensor 114, the multimedia player 115 and the processor 116 of each wearable electronic device 110, respectively, and the feature and the function of the display 522 of the central control host 520 are similar to the feature and the function of the display 122 of the central control host 120, and thus the descriptions thereof are not repeated herein.

Figure 6:
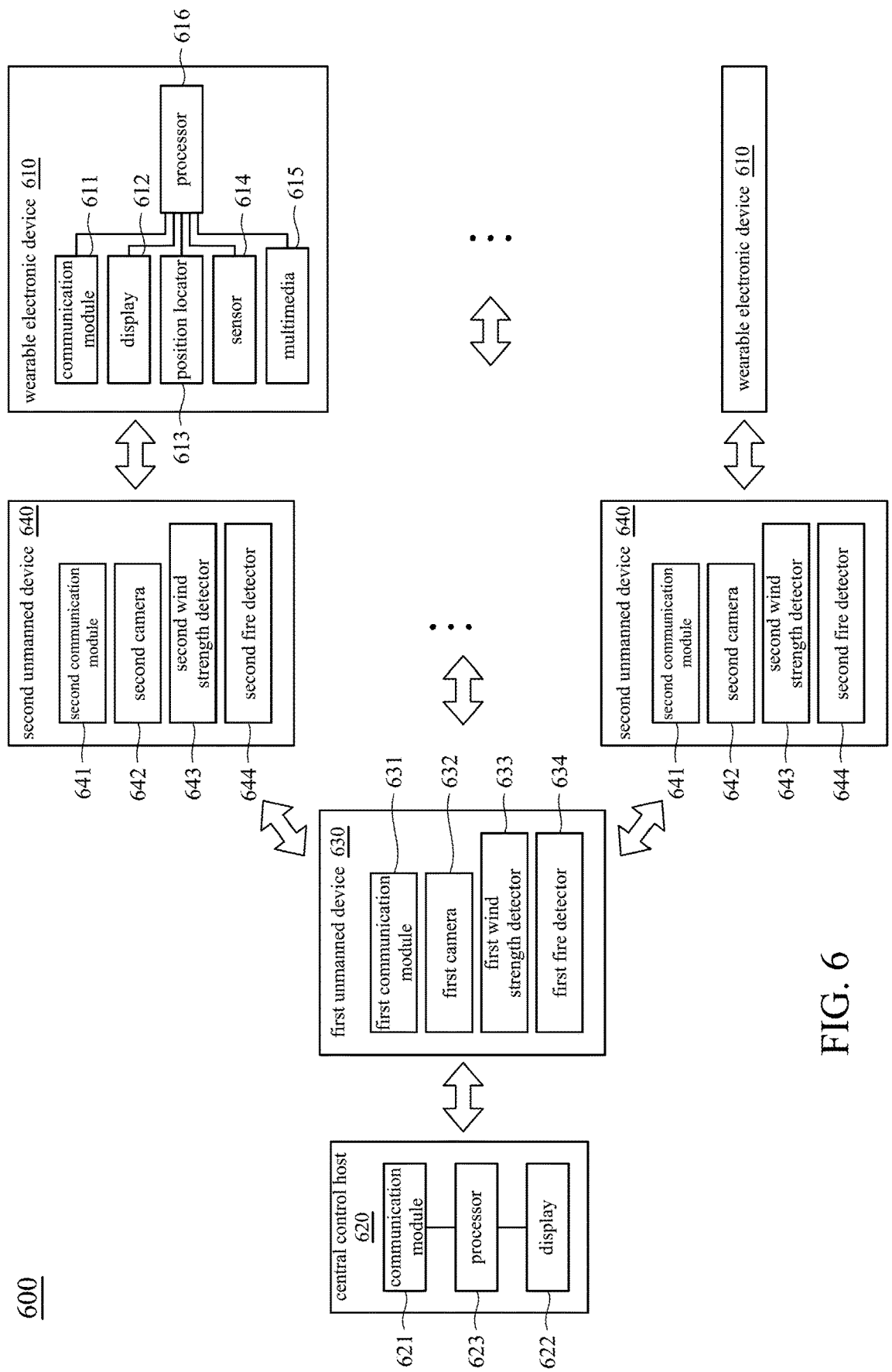
FIG. 6 illustrates a block diagram of the system for safety management in the workplace in accordance with a third embodiment of the present disclosure.

Referring to FIG. 6, FIG. 6 illustrates a block diagram of the system 600 for safety management in the workplace in accordance with a third embodiment of the present disclosure. The system 600 of the third embodiment is similar to the system 500 of the second embodiment, and in contrast with the system 500, the system 600 further includes second unmanned devices 640. The second unmanned devices 640 are such as drones. Each second unmanned device 640 includes a second communication module 641, a second camera 642, a second wind strength detector 643 and a second fire detector 644. In the third embodiment, the second unmanned devices 640 follow the wearable electronic devices 610, respectively. Each second unmanned device 640 is in a position between the first unmanned device 630 and the corresponding wearable electronic device 610, in which each second unmanned device 640 assists to transmit signals between the first unmanned device 630 and the corresponding wearable electronic device 610 through performing wireless communications by each second communication module 641 with the communication module 611 of the corresponding wearable electronic device 610 and the first communication module 631 of the first unmanned device 630, so that the signals between the first unmanned device 630 and the corresponding wearable electronic device 610 are transmitted much better. Each second camera 642 is configured to capture a second image within a second monitoring range at regular time, and the second image is transmitted to the first unmanned device 630 by the corresponding second communication module 641, and the second image is transmitted back to the central control host 620 by the first unmanned device 630. Each second monitoring range is, for example, a capturing image range at the location of second unmanned device 640. The instructor may cooperate to determine the states of the operator in each second monitoring range by watching the second image of each second monitoring range. Each second wind strength detector 643 is configured to detect the wind direction and the wind speed at its location. Each second fire detector 644 is configured to detect whether a fire occurs at its location. Each second fire detector 644 is similar to the fire alarm device performed by the smoke detector or the fixed temperature heat detector. Each of the first unmanned device 630 and the second unmanned devices 640 are configured to use a point-to-point communication method to provide images and the detected wind strength data and the detected fire detection data thereof.

Referring to FIG. 2 and FIG. 6, the system 600 of the third embodiment may also perform the method 200.

The method 200 performed by the system 600 of the third embodiment is similar to the method 200 performed by the system 500 of the second embodiment, in which the differences are steps 220 and 240.

In step 220, the wind strength data and the fire detection data in the environmental data of the workplace may also be provided by the second wind strength detector 643 and the second fire detector 644 of the second unmanned devices 640. For example, the processor 623 may set a new environmental data of the workplace according to the environmental data of the workplace provided by a weather station, the first unmanned device 630 and the second unmanned devices 640, so that the AR warning images conform more to the real environment in the workplace where each operator locates.

In step 240, the communication module 621 is controlled to transmit the AR warning image signals to the first communication module 631 of the first unmanned device 630 first, and the first communication module 631 then transmits the AR warning image signals respectively to the second communication modules 641 of the second unmanned devices 640, and the second communication modules 641 then transmit the AR warning image signals respectively to the communication modules 611 of the wearable electronic devices 610.

In addition, in FIG. 6, the features and the functions of the display 612, the position locator 613, the sensor 614, the multimedia player 615 and the processor 616 of each wearable electronic device 610 are similar to the features and the functions of the display 512, the position locator 513, the sensor 514, the multimedia player 515 and the processor 516 of each wearable electronic device 510, respectively. The feature and the function of the display 622 of the central control host 620 are similar to the feature and the function of the display 522 of the central control host 520. The features and the functions of the first camera 632, the first wind strength detector 633 and the first fire detector 634 of the first unmanned device 630 are similar to the features and the functions of the first camera 532, the first wind strength detector 533 and the first fire detector 534 of the first unmanned device 530, respectively, and thus the descriptions thereof are not repeated herein.

Figure 7:
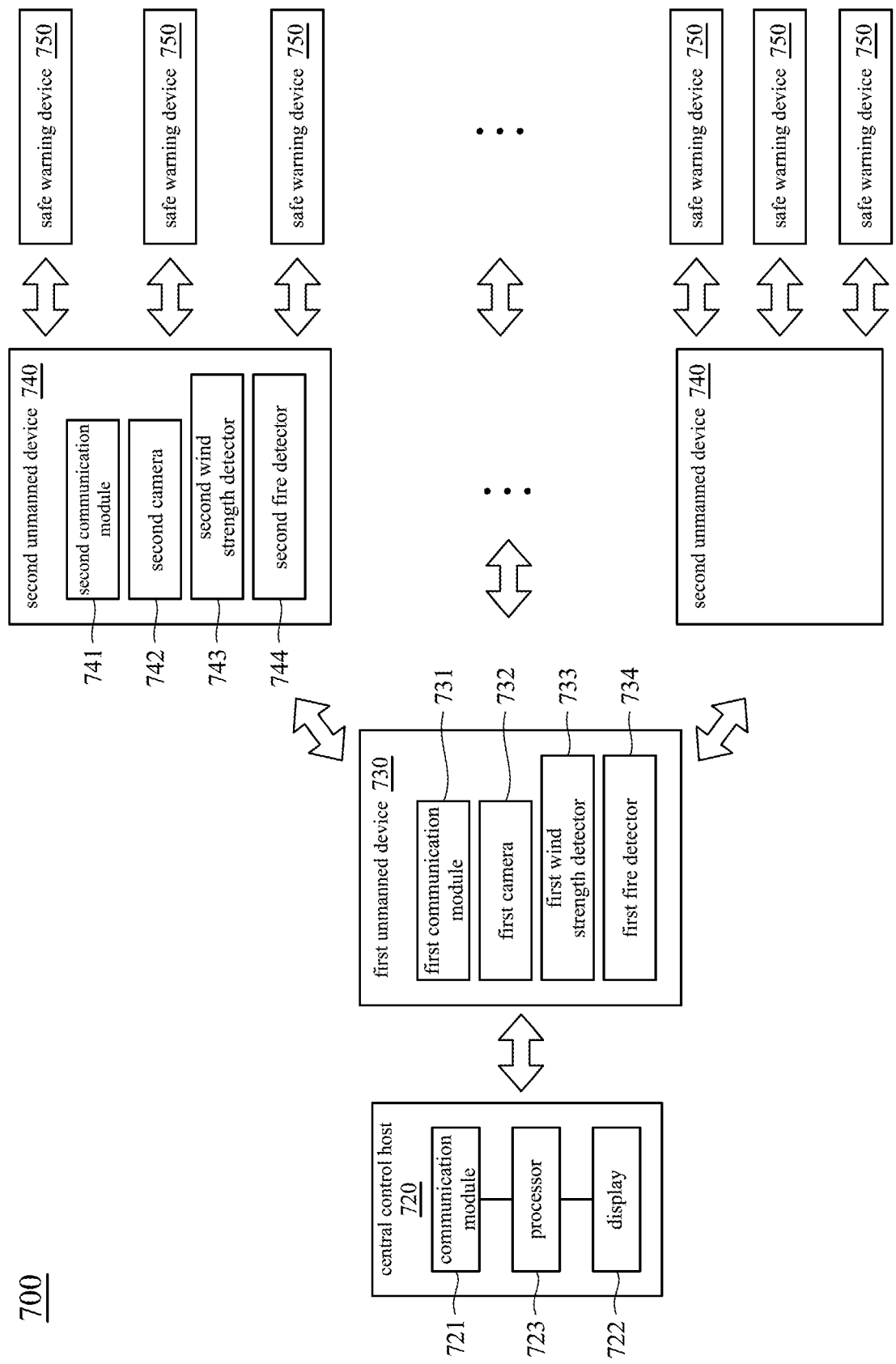
FIG. 7 illustrates a block diagram of the system for safety management in the workplace in accordance with a fourth embodiment of the present disclosure.

Referring to FIG. 7, FIG. 7 illustrates a block diagram of the system 700 for safety management in the workplace in accordance with a fourth embodiment of the present disclosure. The system 700 of the fourth embodiment is similar to the system 600 of the third embodiment, and in contrast with the system 600, the system 700 further includes a plurality of safe warning device 750. The wearable electronic devices are not shown in FIG. 7. The safe warning devices 750 are separately disposed in the areas corresponding to the work zones. Each safe warning device 750 includes a wireless communication module (not shown). Each safe warning device 750 receives an environmental warning signal and generates at least one of light and a voice according to the received environmental warning signal. In this example, each safe warning device 750 is such as a physical warning light and a physical warning light bar disposed in the workplace.

Figure 8:
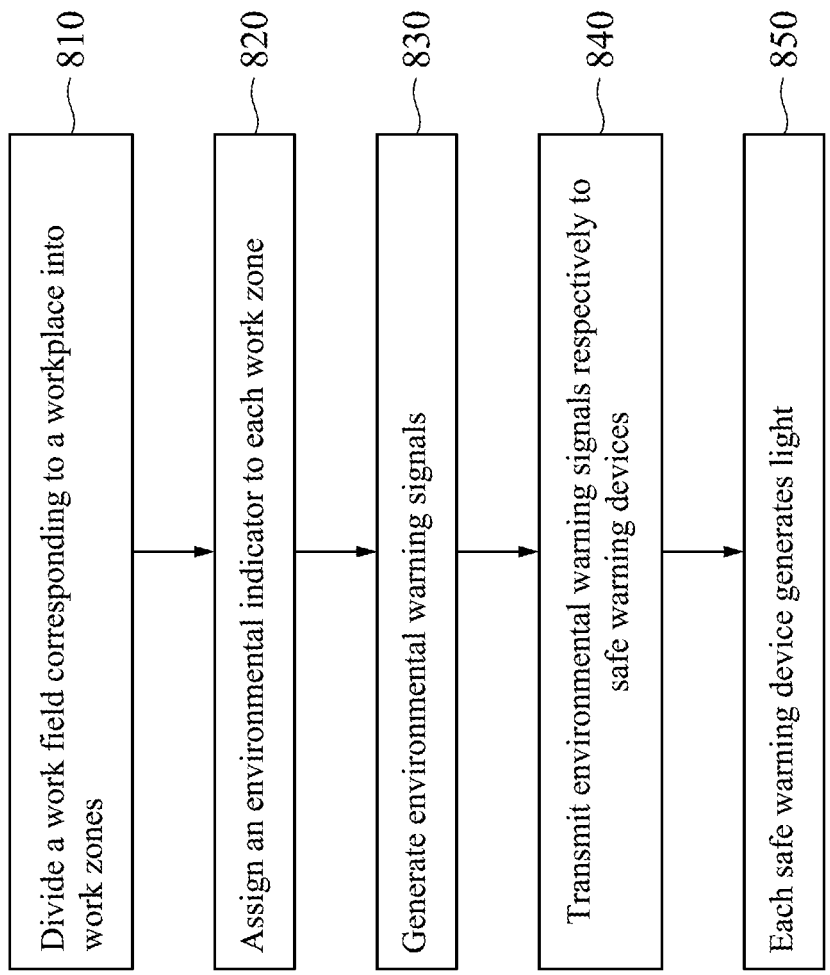
FIG. 8 illustrates a flow chart of the method for safety management in the workplace in accordance with other embodiments of the present disclosure.

Referring to FIG. 8, FIG. 8 illustrates a flow chart of the method 800 for safety management in the workplace in accordance with other embodiments of the present disclosure. The system 700 performs the method 800. The method 800 includes steps 810 to 850. Steps 810 and 820 of the method 800 are similar to steps 210 and 220 of the method 200, and thus the descriptions thereof are not repeated herein.

Then, in step 830, the processor 723 generates the environmental warning signals according to the work zones and the environmental indicators. The environmental warning signals are corresponding to the safe warning devices 750 respectively. Each environmental warning signal indicates the corresponding safe warning device 750 to generate the light.

In step 840, the communication module 721 is controlled to transmit the environmental warning signals to the first communication module 731 of the first unmanned device 730 first, and the first communication module 731 then transmit the environmental warning signals to the second communication modules 741 of the second unmanned devices 740, and the second communication modules 741 then transmit the environmental warning signals respectively to the safe warning devices 750.

In step 850, each safe warning device 750 generates the light according to the received environmental warning signal. For example, the safe warning devices 750 located in the area corresponding to the work zone assigned for the wind and wave dangerous information generate red lights; the safe warning devices 750 located in the area corresponding to the work zone assigned for the wind strength dangerous information generate yellow lights; the safe warning devices 750 located in the area corresponding to the work zone assigned for the wave dangerous information generate blue lights. Therefore, each safe warning device 750 generates lights of different colors according to its location corresponding to the environmental indicator, thereby warning the operators on site.

In addition, in FIG. 7, the feature and the function of the display 722 of the central control host 720 is similar to the feature and the function of the display 622 of the central control host 620. The features and the functions of the first camera 732, the first wind strength detector 733 and the first fire detector 734 of the first unmanned device 730 are similar to the features and the functions of the first camera 632, the first wind strength detector 633 and the first fire detector 634 of the first unmanned device 630, respectively. The features and the functions of the second camera 742, the second wind strength detector 743 and the second fire detector 744 of each second unmanned device 740 are similar to the features and the functions of the second camera 642, the second wind strength detector 643 and the second fire detector 644 of each second unmanned device 640, respectively, and thus the descriptions thereof are not repeated herein.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system for workplace safety management, the system comprising:
　a plurality of wearable electronic devices each comprising
　　a communication module, a display and a processor that is electrically connected to the communication module and the display; and
　a central control host comprising:
　　a communication module configured to perform wireless communications with the communication modules of the wearable electronic devices; and
　　a processor electrically connected to the communication module of the central control host and configured to:
　　　divide a work field corresponding to a workplace into a plurality of work zones;
　　　assign environmental indicators respectively to the work zones according to environmental data of the workplace;
　　　generate a plurality of augmented reality (AR) warning image signals according to the work zones and the environmental indicators; and
　　　transmit the AR warning image signals respectively to the communication modules of the wearable electronic devices via the communication module of the central control host;
　wherein the processors of the wearable electronic devices receive the AR warning image signals respectively from the communication modules of the wearable electronic devices, and wherein each of the processors of the wearable electronic devices controls the display to display an AR warning image according to the received AR warning image signal;
　wherein the processor of the central control host assigning the environmental indicator of each work zone comprises:
　　determining whether a difference between work zone data in the environmental data of the workplace corresponding to each work zone and an environmental base value is in a dangerous range, wherein the environmental base value is adjusted by the processor of the central control host according to at least one of a location of the workplace and a user status;
　　assigning dangerous environmental information to one of the environmental indicators when the corresponding difference is in the dangerous range; and
　　assigning safe environmental information to one of the environmental indicators when the corresponding difference is not in the dangerous range;
　wherein the difference of each work zone comprises a wind speed difference and a wave height difference, and the dangerous environmental information comprises wind strength dangerous information, wave dangerous information and wind and wave dangerous information;

wherein when the processor of the central control host determines whether the difference of each work zone is in the dangerous range and the difference of each work zone is in the dangerous range, the processor of the central control host is configured to:

determine a wind speed dangerous grade of each work zone according to a location of each work zone in the work field and the corresponding wind speed difference, wherein the wind speed dangerous grade comprises one of a first wind speed dangerous grade, a second wind speed dangerous grade and a third wind speed dangerous grade;

determine a wave height dangerous grade of each work zone according to the location of each work zone in the work field and the corresponding wave height difference, wherein the wave height dangerous grade comprises one of a first wave height dangerous grade and a second wave height dangerous grade;

determine the difference of one of the work zones in the dangerous range and assign the wind and wave dangerous information to the environmental indicator when the wind speed dangerous grade is one of the second wind speed dangerous grade and the third wind speed dangerous grade and the wave height dangerous grade is the second wave height dangerous grade in the work zone;

determine the difference of one of the work zones in the dangerous range and assign the wind strength dangerous information to the environmental indicator when the wind speed dangerous grade is the third wind speed dangerous grade and the wave height dangerous grade is the first wave height dangerous grade in the work zone; and determine the difference of one of the work zones in the dangerous range and assign the wave dangerous information to the environmental indicator when the wind speed dangerous grade is the first wind speed dangerous grade and the wave height dangerous grade is the second wave height dangerous grade in the work zone.

2. The system of claim 1, further comprising:

a first unmanned device comprising a communication module that is configured to perform wireless communications with the communication modules of the wearable electronic devices and the communication module of the central control host;

wherein when the processor of the central control host generates and transmits the AR warning image signals to the communication module of the central control host, the communication module of the central control host transmits the AR warning image signals to the communication module of the first unmanned device, and the communication module of the first unmanned device transmits the AR warning image signals respectively to the communication modules of the wearable electronic devices.

3. The system of claim 2, further comprising:

a plurality of second unmanned devices each comprising a communication module that is configured to perform wireless communications with one of the communication modules of the wearable electronic devices and the communication module of the first unmanned device;

wherein when the processor of the central control host generates and transmits the AR warning image signals to the communication module of the central control host, the communication module of the central control host transmits the AR warning image signals to the communication module of the first unmanned device, and the communication module of the first unmanned device transmits the AR warning image signals respectively to the communication modules of the second unmanned devices, and the communication modules of the second unmanned devices transmit the AR warning image signals respectively to the communication modules of the wearable electronic devices.

4. The system of claim 3, wherein the first unmanned device further comprises a first camera that is configured to capture a first image within a first monitoring range, and the first image is transmitted to the central control host via the communication module of the first unmanned device;

wherein each of the second unmanned devices further comprises a second camera that is configured to capture a second image within a second monitoring range, and the second image is transmitted to the first unmanned device via the communication module of the second unmanned device and transmitted to the central control host via the first unmanned device.

5. The system of claim 3, wherein the environmental data of the workplace comprises at least one of wind strength data, wave data and fire detection data in the workplace, wherein the wind strength data comprise wind direction information and wind speed information, and the wave data comprise wave direction information and wave height information.

6. The system of claim 5, wherein the first unmanned device further comprises a first wind strength detector and a first fire detector, wherein the first wind strength detector is configured to detect a wind direction and a wind speed at a location of the first unmanned device, and the first fire detector is configured to detect whether a fire occurs at the location of the first unmanned device;

wherein each of the second unmanned devices further comprises a second wind strength detector and a second fire detector, wherein the second wind strength detector is configured to detect a wind direction and a wind speed at a location of the second unmanned device, and the second fire detector is configured to detect whether a fire occurs at the location of the second unmanned device; and wherein the environmental data of the workplace is provided from at least one of a weather station, the first unmanned device and the second unmanned devices.

7. The system of claim 1, wherein each wearable electronic device further comprises a position locator that is configured to locate at least one of an absolute location of the wearable electronic device and a relative location of the wearable electronic device with respect to other wearable electronic device and to generate a location signal;

wherein each of the location signals is transmitted to the processor of the central control host;

the processor of the central control host determines whether each of the wearable electronic devices is in a dangerous condition according to the location signals of the wearable electronic devices; and the processor of the central control host generates a warning signal when determining one of the wearable electronic devices is in the dangerous condition.

8. The system of claim 1, wherein a plurality of wireless communication connections are built among the wearable electronic devices, and a plurality of video and audio information are transmitted among the wearable electronic devices; and the processor of the central control host transmits a remote control signal via the communication module of the central control host to each wearable electronic device to control the processor of each wearable electronic device.

9. The system of claim 1, wherein the processor of each of the wearable electronic devices controls the display to display an AR operation guide video according to an operation guide instruction; and each of the wearable electronic devices further comprises a sensor that is configured to detect a user's action to generate a sensing signal, and the sensing signal is transmitted to the processor of the wearable electronic device, and the processor of the wearable electronic device determines a control instruction according to the sensing signal to perform an operation.

10. The system of claim 1, further comprising:
a plurality of safe warning devices that are separately disposed in a plurality of areas in the workplace corresponding to the work zones;
wherein the processor of the central control host generates a plurality of environmental warning signals according to the work zones and the environmental indicators, and the environmental warning signals are transmitted respectively to the safe warning devices via the communication module of the central control host; and
each of the safe warning devices generates at least one of light and a voice according to the received environmental warning signal.

11. A method for workplace safety management, the method comprising:
dividing a work field corresponding to a workplace into a plurality of work zones;
assigning an environmental indicator to each of the work zones according to environmental data of the workplace individually;
generating a plurality of AR warning image signals according to the work zones and the environmental indicators;
transmitting the AR warning image signals respectively to a plurality of wearable electronic devices located in the workplace; and
each of the wearable electronic devices displaying an AR warning image according to the received AR warning image signal;
wherein assigning the environmental indicator to each work zone comprises:
determining whether a difference between work zone data in the environmental data of the workplace corresponding to each work zone and an environmental base value is in a dangerous range;
assigning dangerous environmental information to one of the environmental indicators when the corresponding difference is in the dangerous range; and
assigning safe environmental information to one of the environmental indicators when the corresponding difference is not in the dangerous range;
wherein the difference of each work zone comprises a wind speed difference and a wave height difference, and the dangerous environmental information comprises wind strength dangerous information, wave dangerous information and wind and wave dangerous information;

wherein determining whether the difference of each work zone is in the dangerous range and the difference of each work zone in the dangerous range comprise:
determining a wind speed dangerous grade of each work zone according to a location of each work zone in the work field and the corresponding wind speed difference, wherein the wind speed dangerous grade comprises one of a first wind speed dangerous grade, a second wind speed dangerous grade and a third wind speed dangerous grade;
determining a wave height dangerous grade of each work zone according to the location of each work zone in the work field and the corresponding wave height difference, wherein the wave height dangerous grade comprises one of a first wave height dangerous grade and a second wave height dangerous grade;
determining the difference of one of the work zones in the dangerous range and assigning the wind and wave dangerous information to the environmental indicator when the wind speed dangerous grade is one of the second wind speed dangerous grade and the third wind speed dangerous grade and the wave height dangerous grade is the first wave height dangerous grade in the work zone;
determining the difference of one of the work zones in the dangerous range and assigning the wind strength dangerous information to the environmental indicator when the wind speed dangerous grade is the third wind speed dangerous grade and the wave height dangerous grade is the first wave height dangerous grade in the work zone; and
determining the difference of one of the work zones in the dangerous range and assigning the wave dangerous information to the environmental indicator when the wind speed dangerous grade is the first wind speed dangerous grade and the wave height dangerous grade is the second wave height dangerous grade in the work zone.

12. The method of claim 11, wherein the environmental data of the workplace comprises at least one of wind strength data, wave data and fire detection data in the workplace, wherein the wind strength data comprises wind direction information and wind speed information, and the wave data comprises wave direction information and wave height information.

13. The method of claim 12, wherein the environmental data of the workplace is provided from at least one of a weather station and an unmanned device located in the workplace.

14. The method of claim 11, wherein the environmental base value is adjusted according to at least one of a location of the workplace and a user status.

15. The method of claim 11, further comprising:
determining whether each wearable electronic device is in a dangerous condition according to a plurality of location signals generated respectively by the wearable electronic devices, wherein each of the location signals is configured to indicate at least one of an absolute location of the wearable electronic device and a relative location of the wearable electronic device with respect to other wearable electronic device; and
generating a warning signal when one of the wearable electronic devices is in the dangerous condition.

16. The method of claim 11, further comprising:
generating a plurality of environmental warning signals according to the work zones and the environmental indicators;
transmitting the environmental warning signals respectively to a plurality of safe warning devices located in the workplace; and
each of the safe warning devices generating at least one of light and a voice according to the received environmental warning signal.

* * * * *